US010236776B2

(12) United States Patent
Yano et al.

(10) Patent No.: US 10,236,776 B2
(45) Date of Patent: Mar. 19, 2019

(54) INTER-SUPPLY BIDIRECTIONAL DC-DC CONVERTER OF A NON-INSULATION TYPE

(71) Applicants: Tadasuke Yano, Aichi (JP); Yuji Kohara, Aichi (JP)

(72) Inventors: Tadasuke Yano, Aichi (JP); Yuji Kohara, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 15/918,565

(22) Filed: Mar. 12, 2018

(65) Prior Publication Data

US 2018/0287494 A1 Oct. 4, 2018

(30) Foreign Application Priority Data

Mar. 30, 2017 (JP) ................................ 2017-067007

(51) Int. Cl.
*H02M 3/158* (2006.01)
*H02M 1/08* (2006.01)
*H02J 7/00* (2006.01)

(52) U.S. Cl.
CPC ............... *H02M 3/158* (2013.01); *H02J 7/00* (2013.01); *H02M 1/08* (2013.01); *H02M 3/1582* (2013.01)

(58) Field of Classification Search
None
See application file for complete search history.

(56) References Cited

U.S. PATENT DOCUMENTS 7,964,985 B2 6/2011 Ozaki et al.
8,004,109 B2 * 8/2011 Komatsu ............. H02M 5/4585 307/9.1
8,305,018 B2 * 11/2012 Okamura .............. B60K 6/445 318/370
8,478,469 B2 * 7/2013 Ueo ........................ B60L 3/003 701/22

(Continued)

FOREIGN PATENT DOCUMENTS

JP 2003-304644 A 10/2003
JP 2007-295699 A 11/2007

(Continued)

*Primary Examiner* — Henry E Lee, III
(74) *Attorney, Agent, or Firm* — Osha Liang LLP

(57) ABSTRACT

A bidirectional DC-DC converter includes: a voltage conversion circuit; a first switch circuit connected between the voltage conversion circuit and a high-voltage DC power supply; a second switch circuit connected between the voltage conversion circuit and a low-voltage DC power supply; a smoothing capacitor provided between the first switch circuit and the voltage conversion circuit; and a control unit. The control unit controls the second switch circuit such that turn-on time of the second switch circuit gradually increases, and thereafter, controls the voltage conversion circuit such that a voltage-boosting switching element of the voltage conversion circuit is turned on and off. After a predetermined time elapses from when the voltage-boosting switching element starts to be turned on and off, the control unit turns off the voltage-boosting switching element and turns on the first switch circuit.

7 Claims, 10 Drawing Sheets

(56) References Cited

U.S. PATENT DOCUMENTS 8,681,457 B2 * 3/2014 Minegishi ............. B60W 20/10
361/18
9,327,604 B2 * 5/2016 Toda ..................... B60L 15/007
9,837,888 B2 * 12/2017 Yamakawa ........... H02M 3/158

FOREIGN PATENT DOCUMENTS

JP 2007-318849 A 12/2007
JP 2009-232502 A 10/2009
JP 2015-228788 A 12/2015

* cited by examiner

FIG. 7A
FIG. 7B
FIG. 7C
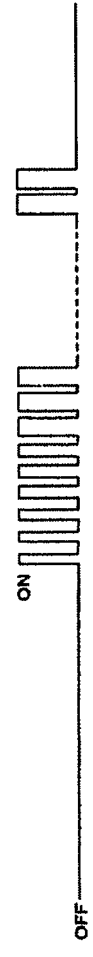
FIG. 7D
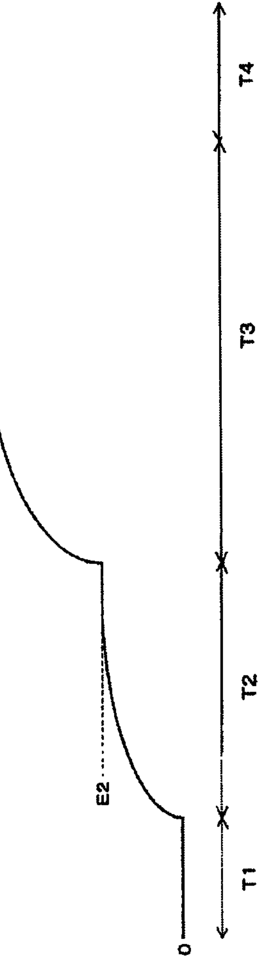

-- Prior Art --

-- Prior Art --

INTER-SUPPLY BIDIRECTIONAL DC-DC CONVERTER OF A NON-INSULATION TYPE

CROSS-REFERENCES TO RELATED APPLICATIONS

This application is based upon and claims the benefit of priority from Japanese Patent Application No. 2017-067007, filed on Mar. 30, 2017; the entire contents of which are incorporated herein by reference.

FIELD

One or more embodiments of the present invention relate to a DC-DC converter that performs a bidirectional power conversion between two DC power supplies, particularly to a bidirectional DC-DC converter of a non-insulation type.

BACKGROUND

A high-voltage battery that supplies electric power to a travel drive system including a motor and a low-voltage battery that supplies electric power to in-vehicle apparatus such as an air conditioner and an audio device are mounted in an electric vehicle and a hybrid car that have been popular recently. Each battery is configured with a secondary battery that can be charged and discharged. For example, a lithium ion battery is used as the high-voltage battery and a lead battery is used as the low-voltage battery. A bidirectional DC-DC converter is provided between the high-voltage battery and the low-voltage battery.

The bidirectional DC-DC converter has a voltage boosting function and a voltage drop function. For example, in a case where the remaining amount of the low-voltage battery is not sufficient, a voltage of the high-voltage battery is dropped by the bidirectional DC-DC converter and supplied to the low-voltage battery to charge the low-voltage battery. In addition, in a case where the remaining amount of the high-voltage battery is not sufficient, a voltage of the low-voltage battery is boosted by the bidirectional DC-DC converter and supplied to the high-voltage battery to charge the high-voltage battery. As such, by using the bidirectional DC-DC converter, electric powers of the two different DC power can be mutually complemented.

There are two types of bidirectional DC-DC converters: an insulation type and a non-insulation type. In the bidirectional DC-DC converter of the insulation type, for example, as described in Japanese Unexamined Patent Application Publication No. 2015-228788, the low-voltage battery side and the high-voltage battery side are insulated by a transformer, and switching elements are respectively provided on a primary side and a secondary side of the transformer. In the bidirectional DC-DC converter of the non-insulation type, for example, as described in Japanese Unexamined Patent Application Publication No. 2003-304644, the low-voltage battery side and the high-voltage battery side are not insulated from each other, and a voltage-drop switching element and a voltage-boosting switching element are provided on an electric path connecting the respective batteries.

FIG. 10 illustrates an example of a bidirectional DC-DC converter of a non-insulation type of related art. A bidirectional DC-DC converter 51 is provided between a high-voltage battery E1 and a low-voltage battery E2, and includes a voltage-drop switching element Q11, a voltage-boosting switching element Q12, a smoothing capacitor C, an inductor L, and a switch SW. D11 and D12 are parasitic diodes of switching elements Q11 and Q12, respectively.

In a case where charging is performed from the high-voltage battery E1 to the low-voltage battery E2, in a state where the switch SW is turned on, a voltage-boosting switching element Q12 is turned off and a voltage-drop switching element Q11 is turned on and off by a PWM signal with a predetermined duty. Thereby, a voltage of the high-voltage battery E1 is dropped in accordance with the duty of the PWM signal and is supplied to a low voltage side to charge the low-voltage battery E2. In addition, in a case where charging is performed from the low-voltage battery E2 to the high-voltage battery E1, in a state where the switch SW is turned on, the switching element Q11 is turned off and the switching element Q12 is turned on and off by the PWM signal. During a period when the switching element Q12 is turned on, electric energy is accumulated in the inductor L. During a period when the switching element Q12 is turned off, the electric energy of the inductor L is discharged via the diode D11, and the high-voltage battery E1 is charged by the boosted voltage.

In the DC-DC converter 51 illustrated in FIG. 10, if the switch SW is turned on at the time of starting up, an excessive inrush current flows from the high-voltage battery E1 to the smoothing capacitor C via the switch SW, and thereby, the smoothing capacitor C may be destroyed. Therefore, in order to suppress the inrush current, preliminary charging the smoothing capacitor C is performed in the related art, before turning on the switch SW (Japanese Unexamined Patent Application Publication No. 2015-228788, Japanese Unexamined Patent Application Publication No. 2007-295699, Japanese Unexamined Patent Application Publication No. 2007-318849, and Japanese Unexamined Patent Application Publication No. 2009-232502).

However, in the bidirectional DC-DC converter 51 of the non-insulation type illustrated in FIG. 10, a low voltage side and a high voltage side are not insulated unlike the bidirectional DC-DC converter of the insulation type, and thereby, the low-voltage battery E2 is constantly connected to the high voltage side via the parasitic diode D11 of the switching element Q11. Accordingly, even if the switch SW and the switching elements Q11 and Q12 are all turned off, a current flows from the low-voltage battery E2 to a load (not illustrated) on the high voltage side via the parasitic diode D11 of the switching element Q11, and thereby, the load abnormally operates or the low-voltage battery E2 is consumed.

As a countermeasure against this, a DC-DC converter 52 illustrated in FIG. 11 includes a switching element Q13 for preventing a reverse current from flowing from a low voltage side to a high voltage side, which is provided between the low-voltage battery E2 and the inductor L. D13 is a parasitic diode of the switching element Q13. Since a direction of the parasitic diode D13 is opposite to a direction of the low-voltage battery E2, a current does not flow from the low-voltage battery E2 to the high voltage side in a state where the switching element Q13 is turned off.

However, even if the switching element Q13 is turned on before the switch SW is turned on to preliminarily charge the smoothing capacitor C from the low-voltage battery E2 when the DC-DC converter 52 starts up, an inrush current flows from the low-voltage battery E2 to the smoothing capacitor C via the parasitic diode D11 by turning on the switching element Q13, and thereby, there is a concern that the smoothing capacitor C is destroyed. Accordingly, it is necessary to separately provide a circuit for preliminarily charging the smoothing capacitor C.

SUMMARY

One or more embodiments of the present invention prevents a smoothing capacitor from being destroyed by an inrush current without providing a particular circuit for a preliminary charge in a bidirectional DC-DC converter of a non-insulation type.

In accordance with one aspect of the present invention, a bidirectional DC-DC converter of a non-insulation type, which is provided between a high-voltage DC power supply and a low-voltage DC power supply, includes a voltage conversion circuit that includes a voltage-drop switching element which drops a voltage of the high-voltage DC power supply and a voltage-boosting switching element which boosts a voltage of the low-voltage DC power supply; a first switch circuit that is connected between the voltage conversion circuit and the high-voltage DC power supply; a second switch circuit that is connected between the voltage conversion circuit and the low-voltage DC power supply; a smoothing capacitor that is provided between the first switch circuit and the voltage conversion circuit and is connected to a positive electrode and a negative electrode of the high-voltage DC power supply through the first switch circuit; and a control unit that controls operations of the voltage conversion circuit, the first switch circuit, and the second switch circuit. The control unit controls the second switch circuit such that turn-on time of the second switch circuit gradually increases from a state in which the first switch circuit and the second switch circuit are turned off, and thereafter, the control unit controls the voltage conversion circuit such that the voltage-boosting switching element of the voltage conversion circuit is turned on and off. After a predetermined time elapses from when the voltage-boosting switching element starts to be turned on and off, the control unit turns off the voltage-boosting switching element and turns on the first switch circuit.

With the above configuration, when an operation of a bidirectional DC-DC converter starts, a second switch circuit is not suddenly turned on and is controlled such that turn-on time gradually increases, and thereby, a preliminary charge is gradually performed from a low-voltage DC power supply to a smoothing capacitor through the second switch circuit. Thus, an inrush current does not flow from the low-voltage DC power supply to the smoothing capacitor, and it is possible to prevent the smoothing capacitor from being destroyed by an excessive inrush current. In addition, with the control circuit can perform control of the second switch circuit without need to add a particular circuit for the preliminary charge of the smoothing capacitor, and thus, it is possible to prevent the number of components from increasing.

In one or more embodiments of the present invention, the control unit may gradually increase turn-on time of the second switch circuit and then constantly turn on the second switch circuit, and thereafter, may turn on and off the voltage-boosting switching element.

Further, in one or more embodiments of the present invention, the second switch circuit may include a first switching element for prevention of a reverse current, the first switching element being connected in parallel with a first diode that is provided in a reverse direction with respect to the low-voltage DC power supply.

Further, in one or more embodiments of the present invention, the second switch circuit may further include a second switching element for protection of a reverse connection, the second switching element being connected in series with the first switching element and being connected in parallel with a second diode that is provided in a forward direction with respect to the low-voltage DC power supply.

Further, in one or more embodiments of the present invention, the control unit may turn on and off the first switching element and the second switching element in synchronization with each other.

Further, in one or more embodiments of the present invention, the control unit may turn on and off only the first switching element and may constantly turn on or constantly turn off the second switching element.

In one or more embodiments of the present invention, a first switch circuit and a smoothing capacitor may be provided outside a bidirectional DC-DC converter. In this case, the bidirectional DC-DC converter is provided between the smoothing capacitor and a low-voltage DC power supply, and includes a voltage conversion circuit, a second switch circuit, and a control unit. The control unit controls the second switch circuit such that turn-on time of the second switch circuit gradually increases from a state in which the first switch circuit and the second switch circuit are turned off, and thereafter, the control unit controls the voltage conversion circuit such that the voltage-boosting switching element of the voltage conversion circuit is turned on and off. After a predetermined time elapses from when the voltage-boosting switching element starts to be turned on and off, the control unit outputs a control signal for turning off the voltage-boosting switching element and turning on the first switch circuit.

According to one or more embodiments of the present invention, it is possible to prevent a smoothing capacitor from being destroyed by an inrush current without providing a particular circuit for a preliminary charge in a bidirectional DC-DC converter of a non-insulation type.

BRIEF DESCRIPTION OF DRAWINGS

FIG. 7A to FIG. 7D are time charts illustrating operations of each unit;

DETAILED DESCRIPTION

Figure 1:
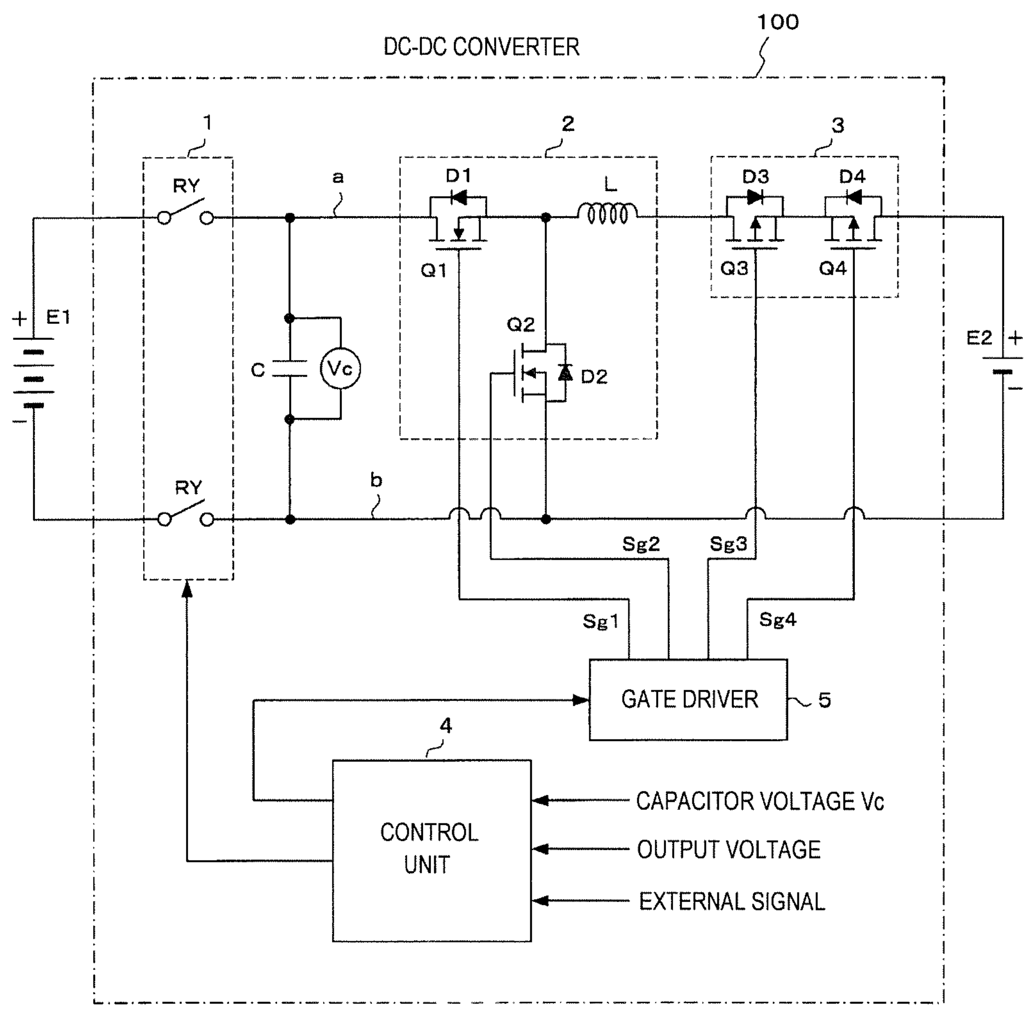
FIG. 1 is a circuit diagram illustrating an example of a bidirectional DC-DC converter according to an embodiment of the present invention.

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Hereinafter, embodiments of the invention will be described with reference to the drawings. In each figure, the same reference numerals or symbols are attached to the same units or the corresponding units.

First, a configuration of a bidirectional DC-DC converter will be described with reference to FIG. 1. In FIG. 1, the bidirectional DC-DC converter 100 of a non-insulation type (hereinafter, simply referred to as a "DC-DC converter") is provided between a high-voltage battery E1 and a low-voltage battery E2, and is mounted on a vehicle such as an electric vehicle or a hybrid car, together with the batteries.

The high-voltage battery E1 is a high-voltage DC power supply that supplies power to a travel drive system including a motor not illustrated, and is configured by, for example, a lithium-ion battery. The low-voltage battery E2 is a low-voltage DC power supply that supplies power to an in-vehicle device such as an air conditioner or an audio device not illustrated, and is configured by, for example, a lead battery. Hereinafter, for the sake of convenience, a voltage of the high-voltage battery E1 is referred to as "E1" and a voltage of the low-voltage battery E2 is referred to as "E2". As an example, E1 is 48 volts DC and E2 is 12 volts DC.

The DC-DC converter 100 includes a switch circuit 1, a voltage conversion circuit 2, a switch circuit 3, a control unit 4, a gate driver 5, a smoothing capacitor C, and a voltage detector Vc.

The switch circuit 1 is connected between the voltage conversion circuit 2 and the high-voltage battery E1. Specifically, the switch circuit 1 is configured with, for example, a relay RY, and a pair of contacts of the relay RY are respectively provided in an electric path a connecting a positive electrode of the high-voltage battery E1 to a positive electrode of the low-voltage battery E2, and an electric path b connecting a negative electrode of the high-voltage battery E1 to a negative electrode of the low-voltage battery E2. The switch circuit 1 corresponds to the "first switch circuit" according to one or more embodiments of the invention.

The voltage conversion circuit 2 is configured with known circuit including a switching element Q1, a switching element Q2, and an inductor L. The switching element Q1 drops a voltage of the high-voltage battery E1, and the switching element Q2 boosts a voltage of the low-voltage battery E2. The switching elements Q1 and Q2 are configured with field effect transistors (FETs). D1 and D2 are parasitic diodes of the switching elements Q1 and Q2, respectively. The inductor L is configured with a coil that accumulates electric energy during a period in which the switching element Q2 is turned on and discharges electric energy during a period in which the switching element Q2 is turned off.

The switch circuit 3 is connected between the voltage conversion circuit 2 and the low-voltage battery E2, and includes two switching elements Q3 and Q4 connected in series. The switching elements Q3 and Q4 are also configured with FETs. D3 and D4 are parasitic diodes of switching elements Q3 and Q4, respectively. The parasitic diode D3 is connected in parallel with the switching element Q3 so as to be in a reverse direction with respect to the low-voltage battery E2. The parasitic diode D4 is connected in parallel with the switching element Q4 so as to be in a forward direction with respect to the low-voltage battery E2.

Figure 11:
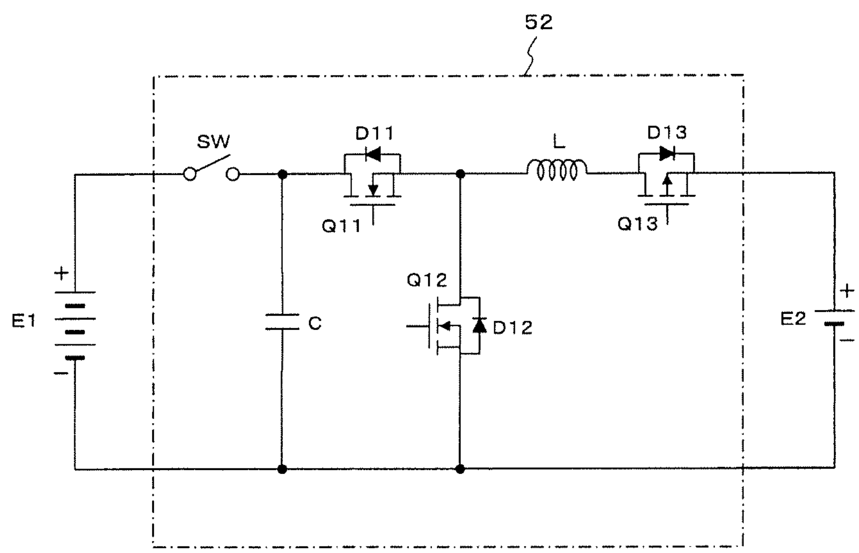
FIG. 11 is a circuit diagram illustrating another example of related art.

The switching element Q3 is used for preventing a reverse current from flowing and has the same function as the switching element Q13 illustrated in FIG. 11. The switching element Q4 is used for protecting a reverse connection, and in a case where the low-voltage battery E2 is connected to have a reverse polarity, an overcurrent is prevented from flowing by the parasitic diode D4 which is in a reverse direction with respect to the battery.

The switch circuit 3 corresponds to a "second switch circuit" according to an embodiment of the invention. The switching element Q3 for preventing a reverse current from flowing is an example of a "first switching element" according to the embodiment of the invention, and the switching element Q4 for protecting a reverse connection is an example of the "second switching element" according to the embodiment of the invention. The parasitic diode D3 is an example of a "first diode" according to an embodiment of the invention, and the parasitic diode D4 is an example of a "second diode" according to the embodiment of the invention.

The control unit 4 is configured with a microcomputer, and controls each operation of the switch circuit 1, the voltage conversion circuit 2, and the switch circuit 3. Specifically, the control unit 4 outputs a control signal for turning on and off the switch circuit 1 to the switch circuit 1. In addition, the control unit 4 gives a control signal for turning on and off the switching elements Q1 and Q2 of the voltage conversion circuit 2 and the switching elements Q3 and Q4 of the switch circuit 3 to the gate driver 5. The control unit 4 receives an output voltage of the DC-DC converter 100 detected by a voltage detector (not illustrated) and an external signal from an electronic control unit (ECU) mounted on a vehicle, in addition to a both-terminal voltage of the smoothing capacitor C detected by the voltage detector Vc.

The gate driver 5 generates gate signals Sg1 to Sg4 for driving the switching elements Q1 to Q4, based on a control signal from the control unit 4 and outputs the gate signals Sg1 to Sg4 to each gate of the switching elements Q1 to Q4. In the present embodiment, the gate signals Sg1 to Sg4 are pulse width modulation (PWM) signals with a predetermined duty. The switching elements Q1 to Q4 are turned on and off by the PWM signals.

The smoothing capacitor C is provided between the switch circuit 1 and the voltage conversion circuit 2, is provided between the electric paths a and b, and is connected to a positive electrode and a negative electrode of the high-voltage battery E1 via the switch circuit 1.

The voltage detector Vc is connected to both terminals of the smoothing capacitor C, and detects a voltage of the smoothing capacitor C. Hereinafter, for the sake of convenience, a voltage value detected by the voltage detector Vc will be referred to as a "capacitor voltage Vc". The detected capacitor voltage Vc is input to the control unit 4.

Next, an operation of the DC-DC converter 100 having the configuration described above will be described with reference to a circuit state transition diagrams of FIGS. 2A to 6B and time charts of FIG. 7A to FIG. 7D. In FIGS. 2A to 6B, the control unit 4 and the gate driver 5 in FIG. 1 are not illustrated.

Figure 2A:
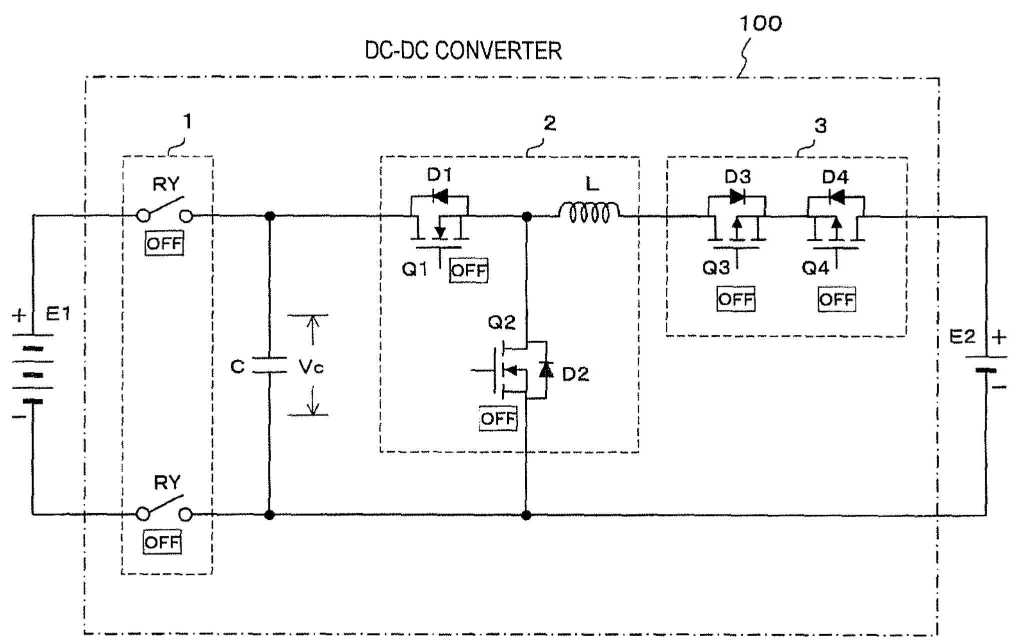
FIGS. 2A and 2B are diagrams illustrating an operation of the bidirectional DC-DC converter.
Figure 2B:
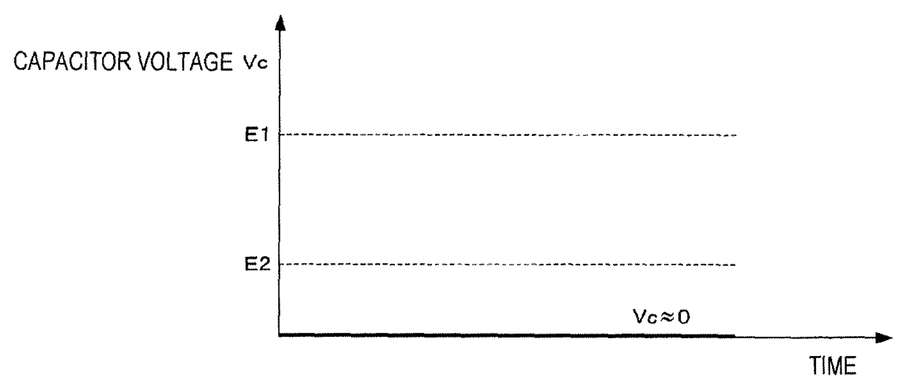

FIGS. 2A and 2B illustrate a state before the DC-DC converter 100 operates. In this state, the relay RY of the switch circuit 1, the switching elements Q1 and Q2 of the voltage conversion circuit 2, and the switching elements Q3 and Q4 of the switch circuit 3 are all turned off, as illustrated in FIG. 2A. Thus, electric power is not exchanged between the high-voltage battery E1 and the low-voltage battery E2. Since the smoothing capacitor C is not charged, the capacitor voltage Vc is approximately zero volt (Vc≈0) as illustrated in FIG. 2B. A state of FIG. 2A corresponds to a period T1 of FIG. 7D.

Figure 3A:
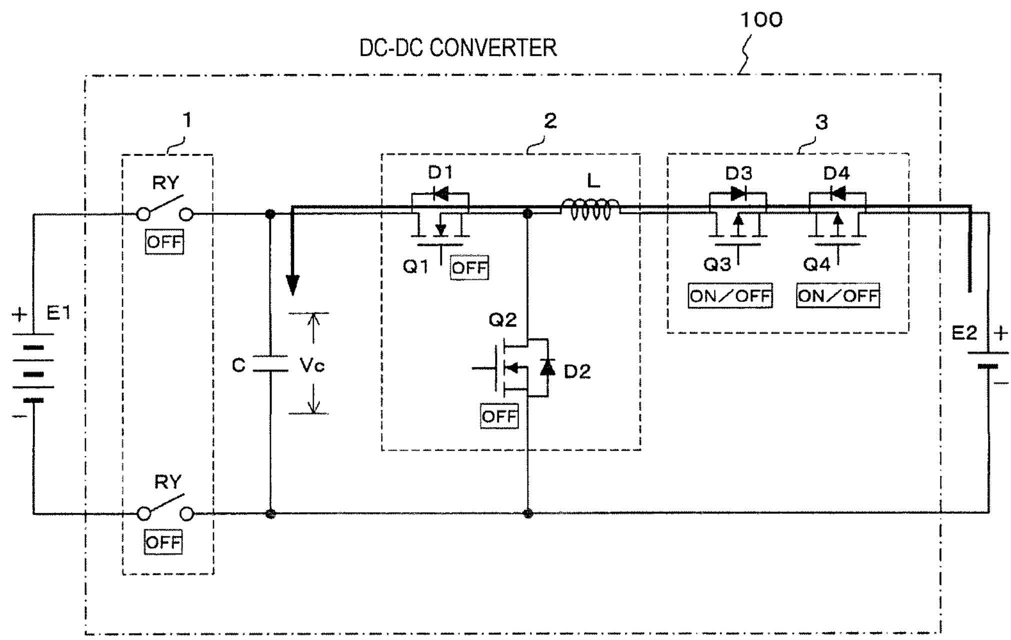
FIGS. 3A and 3B are diagrams illustrating the operation of a bidirectional DC-DC converter.
Figure 3B:
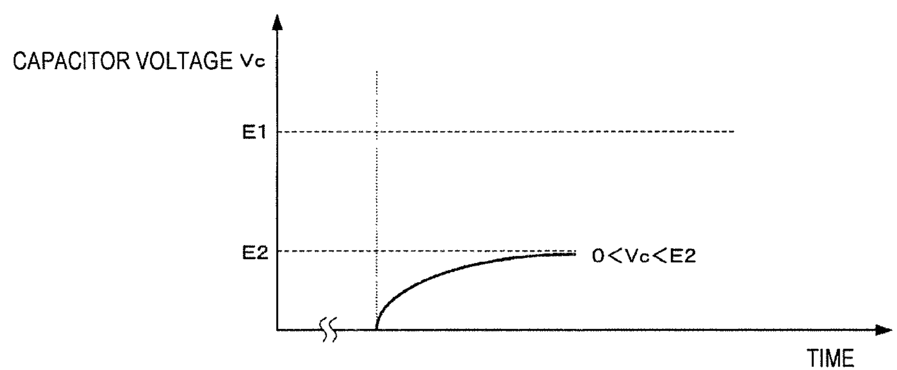

FIGS. 3A and 3B illustrate a state at the time of an operation start of the DC-DC converter 100. At this time, the control unit 4 outputs a control signal for driving the switch circuit 3 to the gate driver 5. The gate driver 5 generates a PWM signal (gate signals Sg3 and Sg4 in FIG. 1), based on the control signal, and outputs the signal to the respective gates of the switching elements Q3 and Q4. As illustrated in FIG. 7A, the PWM signal has a duty in which turn-on times of the switching elements Q3 and Q4 gradually increase. The gate signal Sg3 of the switching element Q3 and the gate signal Sg4 of the switching element Q4 are the same PWM signal, and thus, the switching elements Q3 and Q4 are turned on and off in synchronization with each other. Meanwhile, the relay RY of the switch circuit 1 and the switching elements Q1 and Q2 of the voltage conversion circuit 2 are all maintained in an OFF state.

During a period when the switching elements Q3 and Q4 are turned on, a current flows through a path of the low-voltage battery E2→the switching element Q4→the switching element Q3→the inductor L→the parasitic diode D1→the smoothing capacitor C, as indicated by an arrow of FIG. 3A, and the smoothing capacitor C is charged by the low-voltage battery E2. This charge is hereinafter referred to as a "first preliminary charge". Since the switching elements Q3 and Q4 repeat turning on and off, the capacitor voltage Vc gradually rises (0<Vc<E2) in the first preliminary charge, as illustrated in FIG. 3B. A state of FIG. 3A corresponds to a period T2 of FIG. 7D.

Figure 4A:
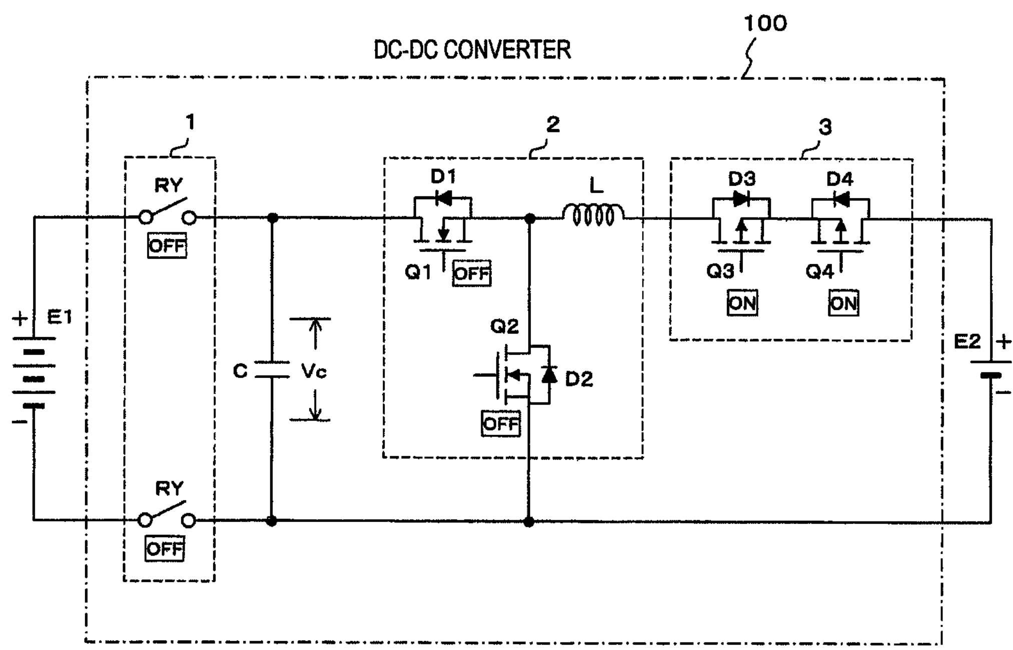
FIGS. 4A and 4B are diagrams illustrating the operation of a bidirectional DC-DC converter.
Figure 4B:
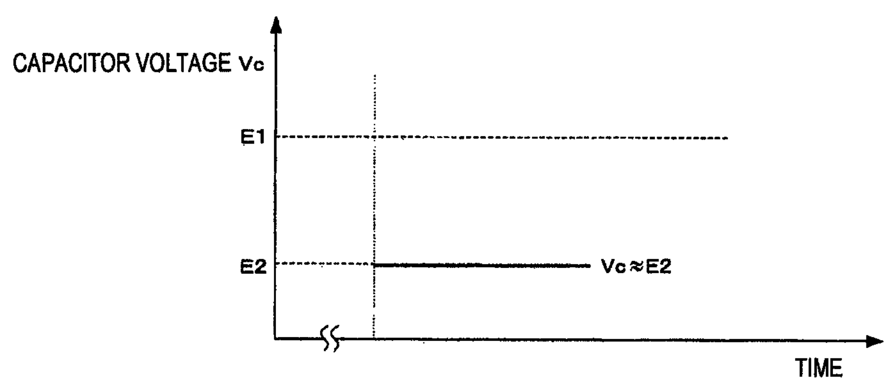

FIGS. 4A and 4B illustrate a state in which the first preliminary charge of the smoothing capacitor C is completed. After the charge is completed, a duty of the PWM signal supplied from the gate driver 5 to the switching elements Q3 and Q4 becomes 100%, and as illustrated in FIG. 4A, the switching elements Q3 and Q4 are constantly turned on (see also FIG. 7A). Meanwhile, the relay RY of the switch circuit 1 and the switching elements Q1 and Q2 of the voltage conversion circuit 2 are all maintained in an OFF state.

As the first preliminary charge of the smoothing capacitor C is completed, the capacitor voltage Vc is approximately equal to the voltage E2 of the low-voltage battery E2 (Vc≈E2) as illustrated in FIG. 4B. A state of FIG. 4A corresponds to the period T2 of FIG. 7D.

Figure 5A:
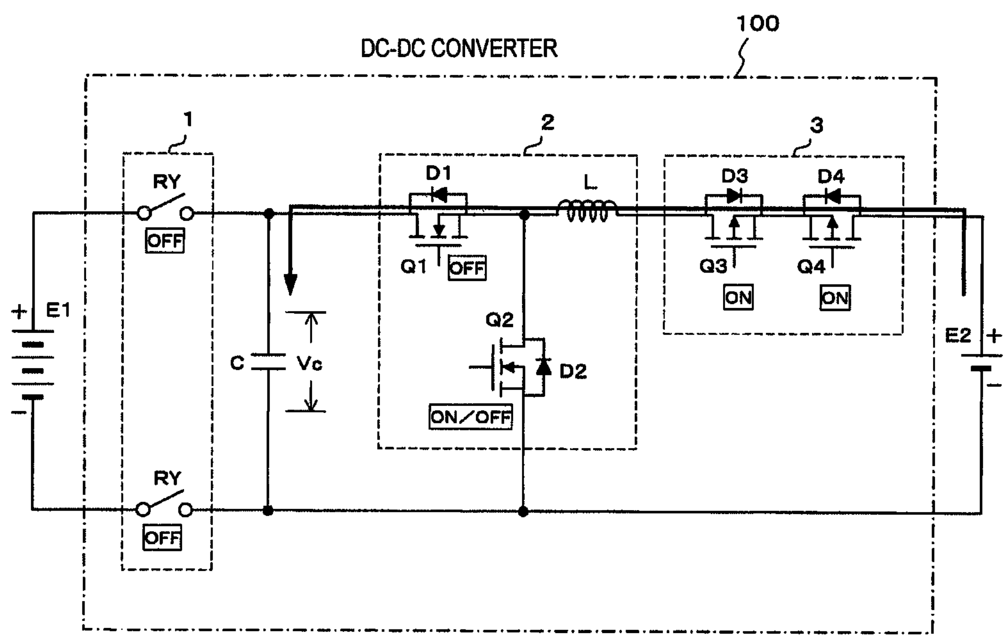
FIGS. 5A and 5B are diagrams illustrating the operation of a bidirectional DC-DC converter.
Figure 5B:
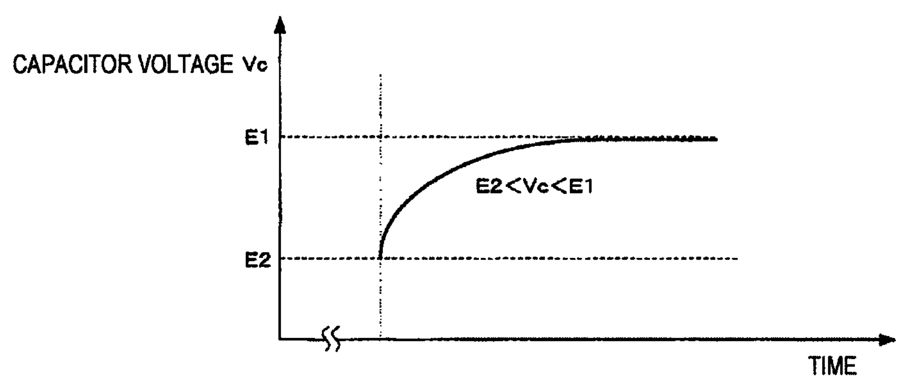

FIGS. 5A and 5B illustrate a state in which, after the switching elements Q3 and Q4 are constantly turned on, the voltage conversion circuit 2 boosts a voltage of the low-voltage battery E2 to charge the smoothing capacitor C again. This charge is hereinafter referred to as a "second preliminary charge". At this time, the control unit 4 outputs a control signal for boosting the voltage of the voltage conversion circuit 2 to the gate driver 5. The gate driver 5 generates a PWM signal (gate signal Sg2 of FIG. 1), based on the control signal, and outputs the signal to a gate of the voltage-boosting switching element Q2. Thereby, as illustrated in FIG. 5A, the switching element Q2 is turned on and off. The PWM signal has a duty in which turn-on time of the switching element Q2 gradually increases, for example, as illustrated in FIG. 7B. However, the duty does not become 100%.

Since the PWM signal (the gate signal Sg1 of FIG. 1) from the gate driver 5 is not supplied to the voltage-drop switching element Q1, the switching element Q1 is maintained in the OFF state, as illustrated in FIG. 5A. In addition, the relay RY of the switch circuit 1 maintains the OFF state, and the switching elements Q3 and Q4 of the switch circuit 3 maintain the ON state.

The capacitor voltage Vc is further raised from E2 by the second preliminary charge of the smoothing capacitor C, as illustrated in FIG. 5B, and approaches E1 (E2<Vc<E1). A state of FIG. 5A corresponds to a period T3 of FIG. 7D. If a predetermined time (T3) elapses after the switching element Q2 starts to be turned on and off, the state becomes a state of FIG. 6A which will be described below. The predetermined time is, for example, the time until the capacitor voltage Vc becomes approximately equal to the voltage E1 of the high-voltage battery. Alternatively, the predetermined time may be a predetermined time measured by a timer.

Figure 6A:
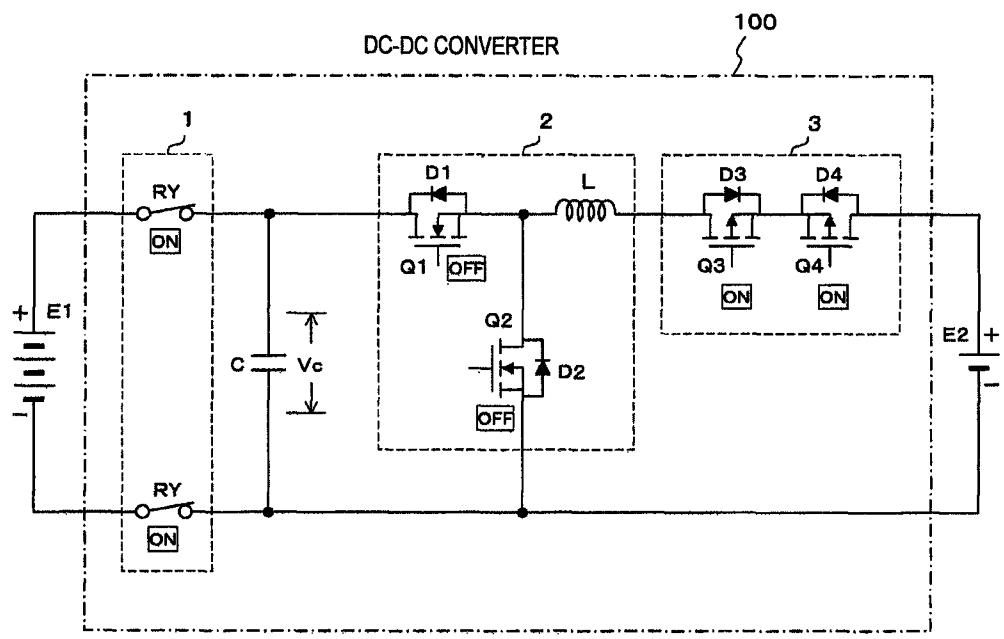
FIGS. 6A and 6B are diagrams illustrating the operation of a bidirectional DC-DC converter.
Figure 6B:
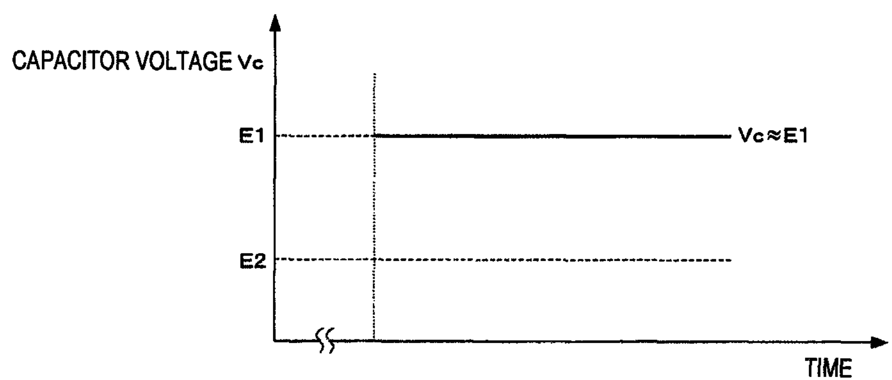

FIGS. 6A and 6B illustrate a state in which the second preliminary charge of the smoothing capacitor C is completed. After the charge is completed, the PWM signal is not supplied from the gate driver 5 to the switching element Q2, and as illustrated in FIG. 6A, the switching element Q2 is turned off (see also FIG. 7B). Accordingly, the voltage conversion circuit 2 stops the voltage boosting operation. Meanwhile, the switching elements Q3 and Q4 of the switch circuit 3 are maintained in the ON state. In addition, as illustrated in FIG. 7C, the relay RY of the switch circuit 1 is turned on based on the control signal from the control unit 4.

When the second preliminary charge of the smoothing capacitor C is completed, the capacitor voltage Vc is charged approximately up to the voltage E1 of the high-voltage battery E1 (Vc≈E1), as illustrated in FIG. 6B. Thus, even if the relay RY is turned on, an inrush current does not flow from the high-voltage battery E1 to the smoothing capacitor C. A state of FIG. 6A corresponds to a period T4 of FIG. 7D.

As the relay RY of the switch circuit 1 is turned on, a power supply path is formed from the high-voltage battery E1 side to the low-voltage battery E2 side and a power supply path is formed from the low-voltage battery E2 side to the high-voltage battery E1 side. Thereafter, under the control of the control unit 4, the DC-DC converter 100 performs a normal operation, and a bidirectional power conversion is performed between the high-voltage battery E1 and the low-voltage battery E2.

According to the above-described embodiment, the control unit 4 controls the switch circuit 3 through the gate driver 5 such that turn-on time of the switch circuit 3 (switching elements Q3 and Q4) gradually increases from a state in which both the switch circuits 1 and 3 are turned off, and thereby, the smoothing capacitor C is gradually charged (first preliminary charge). Thereafter, the control unit 4 controls the voltage conversion circuit 2 through the gate driver 5 such that the voltage-boosting switching element Q2 of the voltage conversion circuit 2 is turned on and off, and thereby the smoothing capacitor C is further charged (second preliminary charge). After a predetermined time elapses from when the switching element Q2 starts to be turned on and off, the switching element Q2 is turned off and the relay RY of the switch circuit 1 is turned on.

Thus, when an operation of the DC-DC converter 100 starts, the switch circuit 3 is not suddenly turned on and the switching elements Q3 and Q4 are turned on and off by the PWM control, and thereby, the first preliminary charge is gradually performed from the low-voltage battery E2 to the smoothing capacitor C. Accordingly, an inrush current does not flow from the low-voltage battery E2 to the smoothing capacitor C, and it is possible to prevent the smoothing capacitor C from being destroyed by an excessive inrush current.

In addition, if the first preliminary charge is completed, the switching element Q2 of the voltage conversion circuit 2 is turned on and off to boost the voltage of the low-voltage battery E2, and the second preliminary charge to the smoothing capacitor C is performed by the boosted voltage. Accordingly, it is possible to charge the smoothing capacitor C approximately up to the voltage E1 of the high-voltage battery E1. Furthermore, if the second preliminary charge is completed, the relay RY is turned on, and thus, a bidirectional power conversion can be performed between the high-voltage battery E1 and the low-voltage battery E2.

In addition, according to the above-described embodiment, the control unit 4 can perform PWM control of the switch circuit 3 (switching elements Q3 and Q4) without need to add a particular circuit for the first preliminary charge and the second preliminary charge, and thus, it is possible to prevent the number of components from increasing.

In FIG. 1, in a case where another capacitor provided in series with the low-voltage battery E2 exists in the electric path a from the positive electrode of the low-voltage battery E2 to the smoothing capacitor C, an inrush current from the low-voltage battery E2 suppressed by the capacitor, and thus, there is no need to adopt one or more embodiments of the invention. Thus, the embodiment is excluded from one or more embodiments of the invention. In other words, one or more embodiments of the invention are directed to a DC-DC converter in which another capacitor different from the smoothing capacitor does not exist in the electrical path from the low-voltage battery to the smoothing capacitor.

In one or more embodiments of the invention, various embodiments which will be described below can be adopted in addition to the above-described embodiments.

Figure 8A:
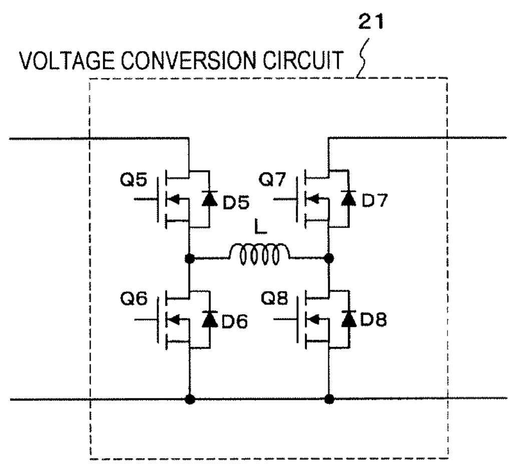
FIGS. 8A and 8B are circuit diagrams illustrating other examples of a voltage conversion circuit.
Figure 8B:
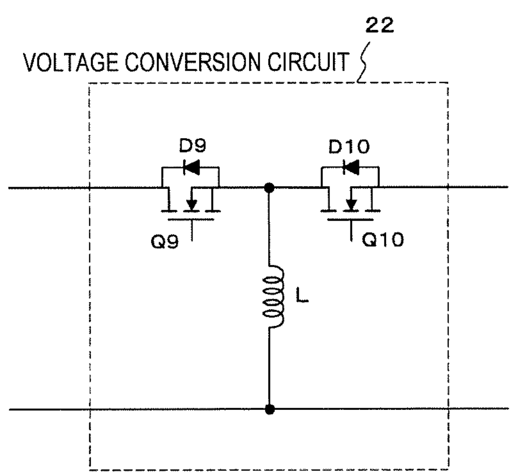

A voltage conversion circuit used in one or more embodiments of the invention is not limited to the voltage conversion circuit 2 illustrated in FIG. 1. For example, as illustrated in FIG. 8A, a voltage conversion circuit 21 including four switching elements Q5 to Q8 and one inductor L can also be used. D5 to D8 are parasitic diodes of switching elements (FETs) Q5 to Q8, respectively. In addition, as illustrated in FIG. 8B, there are two switching elements Q9 and Q10 and one inductor L in the same manner as in FIG. 1, but a voltage conversion circuit 22 in which connection forms of each unit are different from the connection forms of FIG. 1 can also be used. D9 and D10 are parasitic diodes of the switching elements (FETs) Q9 and Q10, respectively.

Figure 9:
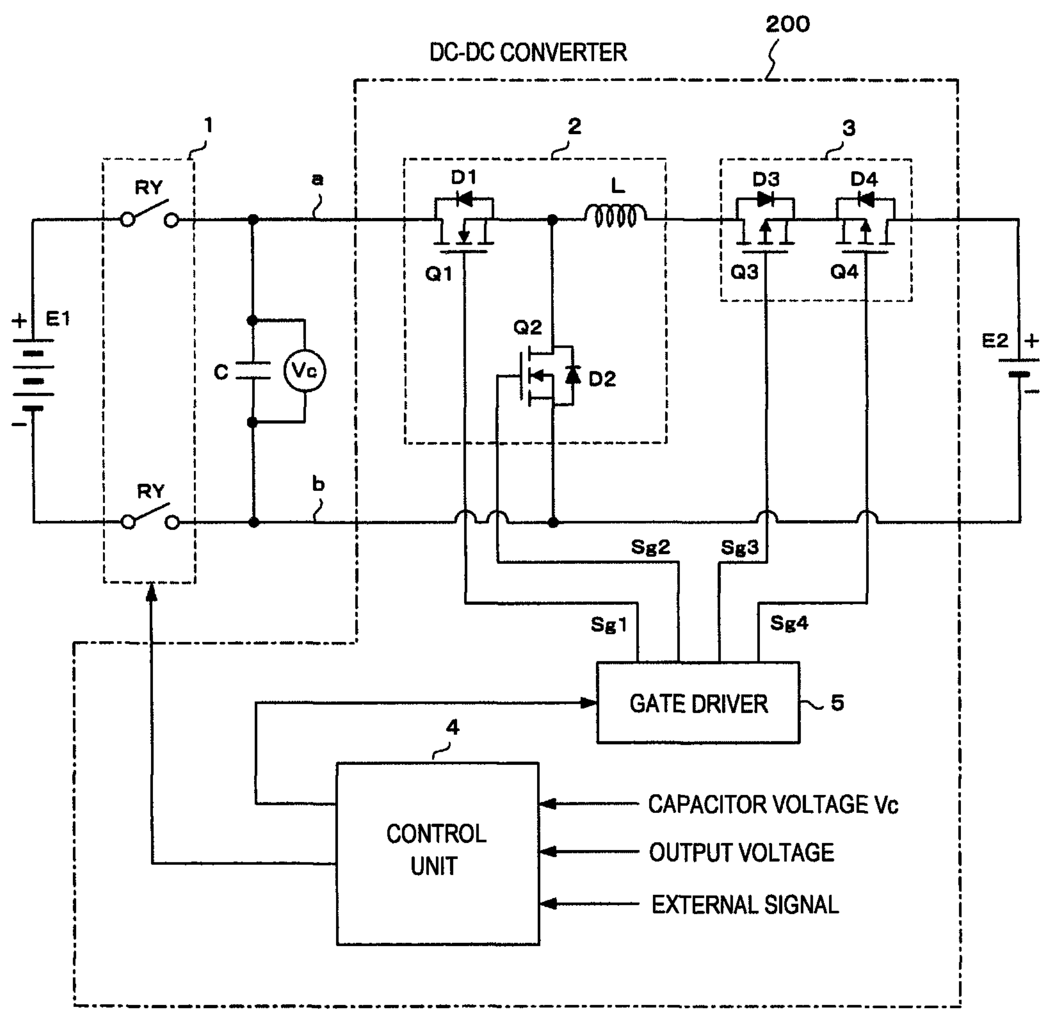
FIG. 9 is a circuit diagram illustrating another embodiment of the present invention.
Figure 10:
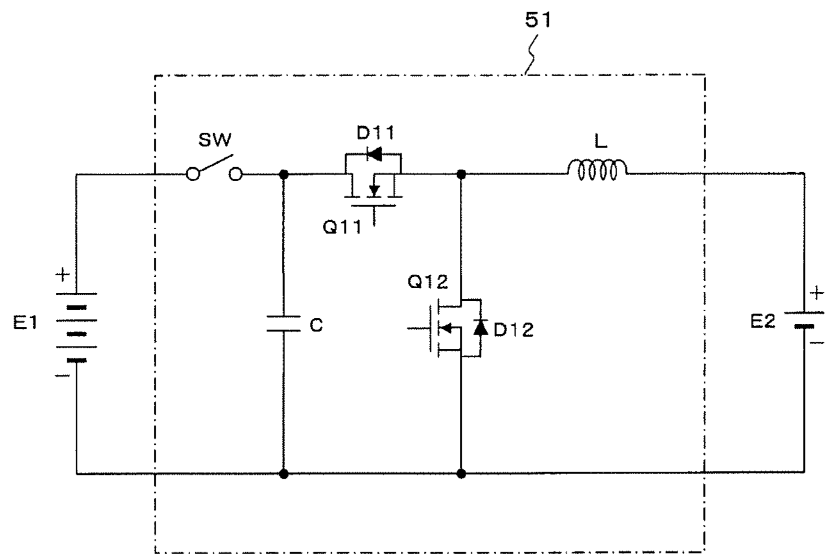
FIG. 10 is a circuit diagram illustrating an example of related art.

In the above embodiment, an example is used in which the DC-DC converter 100 includes the switch circuit 1 and the smoothing capacitor C, but as illustrated in another embodiment of FIG. 9, the switch circuit 1 and the smoothing capacitor C may be provided outside a DC-DC converter 200. In this case, the DC-DC converter 200 is configured with the voltage conversion circuit 2, the switch circuit 3, the control unit 4, and the gate driver 5, and is provided between the smoothing capacitor C and the low-voltage DC power supply E2. The control unit 4 outputs a control signal for turning on and off the switch circuit 1 to the outside of the DC-DC converter 200. The control signal may be directly supplied to the switch circuit 1 or may be supplied to another control unit which controls the switch circuit 1.

In the above embodiment, an example is used in which the same PWM signal is applied to the switching elements Q3 and Q4 of the switch circuit 3 and the switching elements Q3 and Q4 are turned on and off in synchronization with each other (FIG. 3). However, one or more embodiments of the invention are not limited to this. For example, only the switching element Q3 may be turned on and off, and the switching element Q4 may be constantly turned on. Alternatively, only the switching element Q3 may be turned on and off, and the switching element Q4 may be constantly turned off. Even if the switching element Q4 is constantly turned off, the parasitic diode D4 becomes the preliminary charge path of FIG. 3, and thus, there is no problem.

In the above embodiment, an example is used in which the switch circuit 3 includes the switching element Q3 for preventing a reverse current from flowing and the switching element Q4 for protecting a reverse connection, but since the switching element Q4 is not essential to one or more embodiments of the invention, the switching element Q4 may be omitted.

In the above embodiment, the batteries E1 and E2 are used as examples of the high-voltage DC power supply and the low-voltage DC power supply, but the DC power supplies are not limited to the batteries, and may be electric accumulation elements such as a capacitor.

In the above embodiment, the relay RY is used as the switch circuit 1, but a switching element such as an FET may be used instead of the relay RY. In addition, in the above embodiment, FETs are used as the switching elements Q1 to Q10, but switching elements such as insulated gate bipolar transistors (IGBTs) may be used instead of the FETs.

In the above embodiment, a bidirectional DC-DC converter of a non-insulation type mounted on a vehicle is used as an example, but one or more embodiments of the invention can also be applied to a bidirectional DC-DC converter of a non-insulation type which is used for an application other than the vehicle.

While the invention has been described with respect to a limited number of embodiments, those skilled in the art, having benefit of this disclosure, will appreciate that other embodiments can be devised which do not depart from the scope of the invention as disclosed herein. According, the scope of the invention should be limited only by the attached claims.

The invention claimed is:

1. A bidirectional DC-DC converter of a non-insulation type that is provided between a high-voltage DC power supply and a low-voltage DC power supply, the bidirectional DC-DC converter comprising:

a voltage conversion circuit that comprises a voltage-drop switching element which drops a voltage of the high-voltage DC power supply and a voltage-boosting switching element which boosts a voltage of the low-voltage DC power supply;

a first switch circuit that is connected between the voltage conversion circuit and the high-voltage DC power supply;

a second switch circuit that is connected between the voltage conversion circuit and the low-voltage DC power supply;

a smoothing capacitor that is provided between the first switch circuit and the voltage conversion circuit and is connected to a positive electrode and a negative electrode of the high-voltage DC power supply through the first switch circuit; and a control unit that controls operations of the voltage conversion circuit, the first switch circuit, and the second switch circuit, wherein the control unit controls the second switch circuit such that turn-on time of the second switch circuit gradually increases from a state in which the first switch circuit and the second switch circuit are turned off, and thereafter, controls the voltage conversion circuit such that the voltage-boosting switching element of the voltage conversion circuit is turned on and off, and wherein after a predetermined time elapses from when the voltage-boosting switching element starts to be turned on and off, the control unit turns off the voltage-boosting switching element and turns on the first switch circuit.

2. The bidirectional DC-DC converter according to claim 1, wherein the control unit gradually increases turn-on time of the second switch circuit and then constantly turns on the second switch circuit, and thereafter, turns on and off the voltage-boosting switching element.

3. The bidirectional DC-DC converter according to claim 1, wherein the second switch circuit comprises a first switching element for prevention of a reverse current, the first switching element being connected in parallel with a first diode that is provided in a reverse direction with respect to the low-voltage DC power supply.

4. The bidirectional DC-DC converter according to claim 3, wherein the second switch circuit further comprises a second switching element for protection of a reverse connection, the second switching element being connected in series with the first switching element and being connected in parallel with a second diode that is provided in a forward direction with respect to the low-voltage DC power supply.

5. The bidirectional DC-DC converter according to claim 4, wherein the control unit turns on and off the first switching element and the second switching element in synchronization with each other.

6. The bidirectional DC-DC converter according to claim 4, wherein the control unit turns on and off only the first switching element and constantly turns on or constantly turns off the second switching element.

7. A bidirectional DC-DC converter of a non-insulation type that is provided between a smoothing capacitor and a low-voltage DC power supply, the smoothing capacitor being connected to a positive electrode and a negative electrode of a high-voltage DC power supply through a first switch circuit, the bidirectional DC-DC converter comprising:

a voltage conversion circuit that comprises a voltage-drop switching element which drops a voltage of the high-voltage DC power supply and a voltage-boosting switching element which boosts a voltage of the low-voltage DC power supply;

a second switch circuit that is connected between the voltage conversion circuit and the low-voltage DC power supply; and a control unit that controls operations of the voltage conversion circuit, the first switch circuit, and the second switch circuit, wherein the control unit controls the second switch circuit such that turn-on time of the second switch circuit gradually increases from a state in which the first switch circuit and the second switch circuit are turned off, and thereafter, controls the voltage conversion circuit such that the voltage-boosting switching element of the voltage conversion circuit is turned on and off, and wherein, after a predetermined time elapses from when the voltage-boosting switching element starts to be turned on and off, the control unit outputs a control signal for turning off the voltage-boosting switching element and turning on the first switch circuit.

* * * * *